United States Patent
VanValkenburgh

(10) Patent No.: US 7,100,928 B1
(45) Date of Patent: Sep. 5, 2006

(54) MOTORCYCLE REAR STAND

(76) Inventor: Charles Nicholas VanValkenburgh, 620 Pearl Ave., Huntsville, AL (US) 35801

( * ) Notice: Subject to any disclaimer, the term of this patent is extended or adjusted under 35 U.S.C. 154(b) by 79 days.

(21) Appl. No.: 10/887,649

(22) Filed: Jul. 9, 2004

(51) Int. Cl.
*B66F 3/00* (2006.01)

(52) U.S. Cl. .................. 280/164.1; 280/166; 280/163; 280/164.2

(58) Field of Classification Search ............... 254/131, 254/120; 211/22, 20; 280/47.24, 79.4, 47.25, 280/47.131, 47.15, 164.1, 166, 163, 164.2 280/169
See application file for complete search history.

(56) References Cited

U.S. PATENT DOCUMENTS

| | | | | |
|---|---|---|---|---|
| 5,286,049 A * | 2/1994 | Khan | ................. | 280/163 |
| 5,971,360 A * | 10/1999 | Sinsley | ................. | 254/8 B |
| 6,173,979 B1 * | 1/2001 | Bernard | ................. | 280/163 |
| 6,341,763 B1 * | 1/2002 | Lefebvre | ................. | 254/131 |
| 6,409,193 B1 * | 6/2002 | Bernard | ................. | 280/163 |
| 6,412,799 B1 * | 7/2002 | Schrempf | ................. | 280/163 |
| 6,474,625 B1 * | 11/2002 | Bevre | ................. | 254/131 |
| 6,488,157 B1 * | 12/2002 | Chen | ................. | 211/20 |
| 6,513,821 B1 * | 2/2003 | Heil | ................. | 280/169 |
| 6,536,790 B1 * | 3/2003 | Ojanen | ................. | 280/163 |
| 6,581,946 B1 * | 6/2003 | Lund et al. | ................. | 280/163 |
| 6,726,230 B1 * | 4/2004 | Weir | ................. | 280/163 |
| 6,840,506 B1 * | 1/2005 | Siivonen | ................. | 254/131 |

* cited by examiner

Primary Examiner—J. Allen Shriver
Assistant Examiner—Cynthia F. Collado
(74) Attorney, Agent, or Firm—Waddey and Patterson PC; Larry W. Brantley; Howard H. Bayless

(57) ABSTRACT

A stand for lifting the rear end of a motorcycle that comprises a supporting base, rolling wheels, and a leverage arm. The stand is placed under the motorcycle in front of the rear wheel and engages the swingarm near the rear axle. Operation is accomplished by pushing the leverage arm forward and downward to the ground. An adjustable bracket allows for adjustment of the stand for motorcycles of various heights or for lifting the same motorcycle to different heights as desired.

9 Claims, 2 Drawing Sheets

MOTORCYCLE REAR STAND

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

Stands that support a motorcycle are a necessary tool in order to properly do maintenance or cleaning. Rear stands that engage the swingarm and raise the rear end of a motorcycle off the ground normally have been configured such that the operator stands behind the motorcycle and leverages the stand down to the ground. The stand is normally equipped with a frame consisting of parallel members and rollers oriented so as to allow the stand to "snap" securely underneath the motorcycle while raising the rear wheel off the ground. A common configuration of such a stand is the subject of U.S. Pat. No. 6,488,157. Certain limitations of this configuration are encountered during use of this type of stand. The leveraging member or "handle" will protrude rearward of the motorcycle and close to the ground and can be in the way when performing work. Because this stand is operated from behind the motorcycle, space can be a limitation if maintenance is required in tight places. Racing motorcycles are especially in need of rear stands because these are not equipped with traditional kickstands. A rear stand must always be kept handy for use wherever the motorcycle is located. Another limitation of a traditional rear stand is that an operator must balance the motorcycle in the vertical position with one hand on the rear end of the bike while placing and leveraging the rear stand with the other hand. This can be tricky to say the least. The present invention is a novel solution to the limitations and difficulties of using a traditional rear stand.

BRIEF SUMMARY OF THE INVENTION

A novel design of a motorcycle rear stand that leverages the rear of a motorcycle off the ground and supports the motorcycle is disclosed. The stand is low profile and is placed underneath the motorcycle in front of the rear tire. The leverage arm is located on the side of the stand such that the stand be operated without interference with the motorcycle bodywork or footpegs. The stand engages the swingarm at a point near the rear axle and as the leverage arm is rotated forward the stand rolls on wheels and "snaps" underneath the swingarm to support the motorcycle. The stand may be configured to be operated from either side of the motorcycle. Adjustable and reversible brackets for swingarm engagement are provided for versatility.

Other objects and advantages of the present invention will be apparent from the following description, the accompanying drawings and the appended claims.

DETAILED DESCRIPTION OF THE INVENTION

Figure 1:
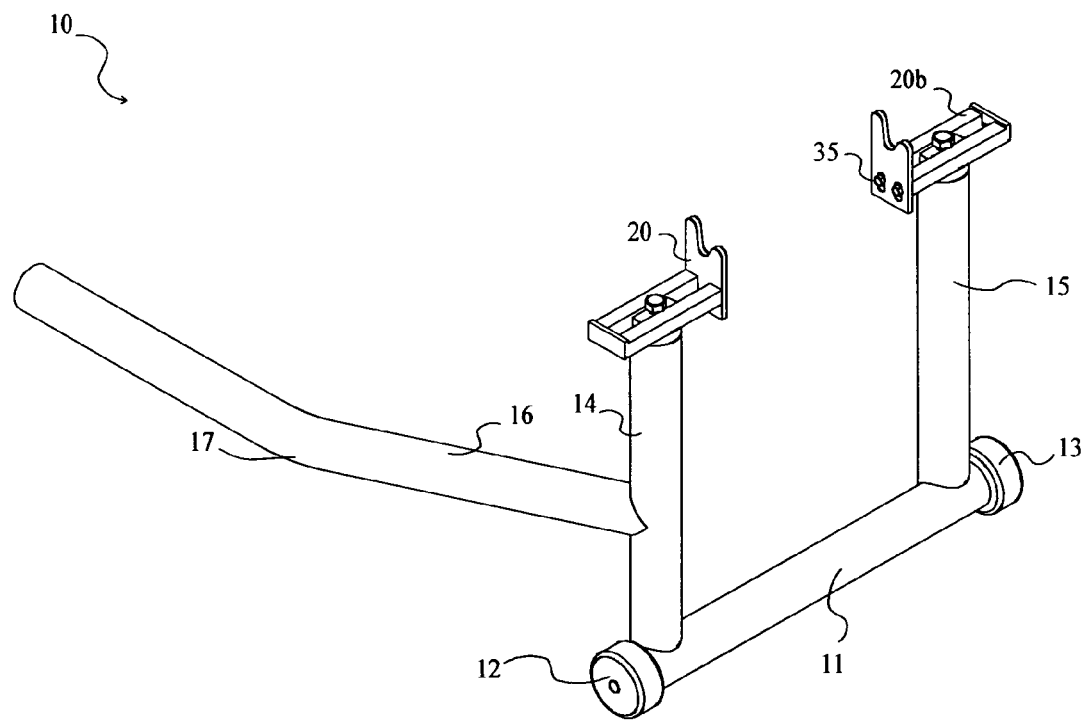
FIG. 1 is a perspective view of the improved stand
Figure 2:
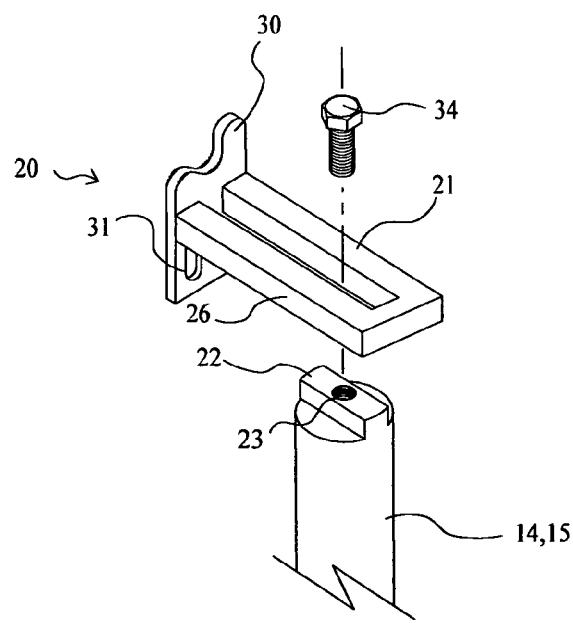
FIG. 2 is a perspective view of the adjustable bracket in detail

Referring to FIGS. 1 and 2, the embodiment of the stand of the present invention has a support frame designated generally at 10. The frame 10 has a transverse main cross member 11. A pair of wheels 12, 13 are mounted coaxially to each end of the cross member 11 to facilitate rolling of the stand across the ground. A pair of parallel vertical support members 14, 15 are mounted to the ends of the main cross member 11 just inside the wheels 12, 13. Mounted to one of the vertical support members 14, 15 is a leverage arm 16. This leverage arm 16 projects outwardly and forwardly at some angle that enables it to avoid contact with the motorcycle when the stand is in use. The leverage arm 16 may be shaped with a bend 17 at some point along its length to facilitate its use. The leverage arm 16 may be mounted to vertical support 14 at a point about midway up its length, but the design of the motorcycle may influence the arm's location.

Attached to the top of each vertical support member 14, 15 is an adjustable bracket designated generally at 20 to facilitate operation of the stand with motorcycles of varying heights, widths, and different swingarm configurations. FIG. 2 shows the adjustable bracket in detail. The adjustable bracket 20 consists of a pair of horizontal members 21, 26 that are spaced apart so as to fit over a horizontally disposed guide 22 at the top of vertical members 14, 15. A support plate 30 is attached to the inward end of horizontal member 21, 26 and has a profile that allows engagement of spools on a motorcycle or can be made with a flat profile to engage the underside of the motorcycle swingarm. Support plate 30 is made to be adjustable in the vertical direction by means of slots 31 machined into the face of the plate. The support plate 30 is mounted to horizontal members 21, 26 by means of bolts 35 (see FIG. 1). This vertical adjustability allows for ease of use with motorcycles of varying heights. Bolts 35 are not the only means contemplated for affixing the plate 30 to horizontal members 21, 26 and adjustability may be accomplished by means of pins or other brackets that are common in the art.

Figure 3:
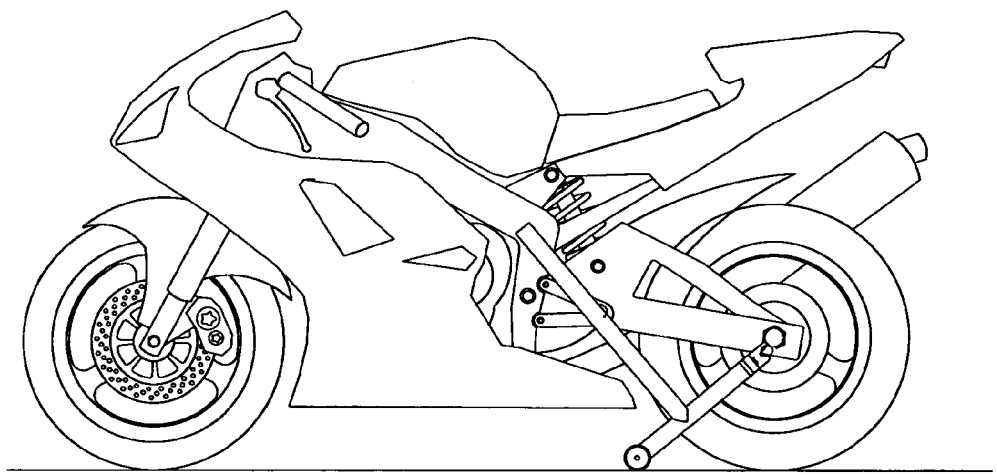
FIG. 3 is an elevation view of the stand ready for operation.
Figure 4:
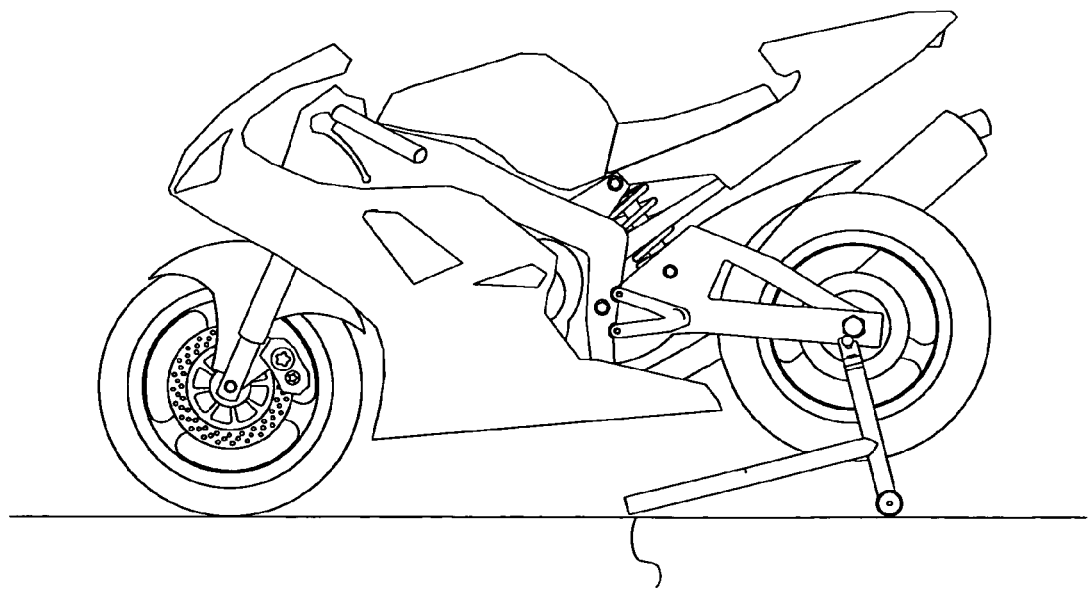
FIG. 4 is an elevation view of the stand after operation.

As shown in FIG. 3, operation of the stand is accomplished by placing the stand under the motorcycle just in front of the rear wheel. The leverage arm 16 will be in a more generally vertical position to accomplish this as the vertical members 14, 15 must clear the underside of the motorcycle. After the stand is under the motorcycle, the engagement brackets 20, 20b are engaged with the appropriate mating members of the motorcycle near the rear axle. To raise and support the motorcycle, the leverage arm 16 is forced toward the ground and the rear end of the motorcycle is leveraged upward as the stand rolls on its wheels until the leverage arm contacts the ground at 50. In FIG. 4 you can see that the main cross member 11 and the attached wheels 12, 13 of the stand will pass under the tire to a point rearward of the motorcycle's axle. This secures the stand under the motorcycle by the force of gravity.

Simply reversing the process lowers the motorcycle. The leverage arm 16 is raised and the wheels 12, 13 roll forward as the motorcycle drops to the ground.

I claim:

1. A motorcycle stand, comprising:
a base;
a pair of wheels connected to the base;
first and second support members connected to and extending outward from the base;
a leverage arm connected to and extending outward from the first support member, the leverage arm being connected approximately perpendicular to the first support member intermediate an upper and lower end of the first support member; and
first and second brackets connected to the first and second support members,
wherein the first support member has a cylindrical shape, is connected to the base adjacent to a first end of the base, and extends outward vertically from and approximately perpendicular to the base, and
wherein the first support member has a guide extending outward from an upper end of the first support member; and
the guide has an approximately rectangular shape and includes a threaded opening defined therein.

2. A motorcycle stand, comprising:
a base;
a pair of wheels connected to the base;
first and second support members connected to and extending outward from the base;
a leverage arm connected to and extending outward from the first support member, the leverage arm being connected approximately perpendicular to the first support member intermediate an upper and lower end of the first support member; and
first and second brackets connected to the first and second support members,
wherein the first support member has a cylindrical shape, is connected to the base adjacent to a first end of the base, and extends outward vertically from and approximately perpendicular to the base,
wherein the first support member has a guide extending outward from an upper end of the first support member; and
the guide has an approximately rectangular shape and includes a threaded opening defined therein, and
wherein the upper end of the first support member has a diameter and the guide has a length approximately equal to the diameter of the upper end of the first support member; and
the guide extends in a direction that is approximately parallel with the base.

3. A motorcycle stand, comprising:
a base;
a pair of wheels connected to the base;
first and second support members connected to and extending outward from the base;
a leverage arm connected to and extending outward from the first support member, the leverage arm being connected approximately perpendicular to the first support member intermediate an upper and lower end of the first support member; and
first and second brackets connected to the first and second support members, wherein:
the first bracket includes a u-shaped portion and a support plate perpendicularly connected to one end of the u-shaped portion;
the u-shaped portion includes two elongated rectangular shaped members spaced apart from and parallel to one another; and
the u-shaped portion has a length and includes a channel that has a length that is shorter than the length of the unshaped portion.

4. A motorcycle stand, comprising:
a base;
a pair of wheels connected to the base;
first and second support members connected to and extending outward from the base;
a leverage arm connected to and extending outward from the first support member, the leverage arm being connected approximately perpendicular to the first support member intermediate an under and lower end of the first support member; and
first and second brackets connected to the first and second support members, wherein:
the first bracket includes a u-shaped portion and a support plate perpendicularly connected to one end of the u-shaped portion;
the u-shaped portion includes two elongated rectangular shaped members spaced apart from and parallel to one another; and
the u-shaped portion has a length and includes a channel that has a length that is shorter than the length of the u-shaped portion,
wherein the support plate is approximately flat, includes a first end that is approximately square shaped, and includes a second end having a rounded notch defined therein, and
wherein the second end of the support plate includes first and second rounded portions extending outward therefrom and the rounded notch is positioned intermediate the first and second rounded portions;
the second rounded portion has a length and the first rounded portion has a length that is longer than the length of the second rounded portion; and
the first end of the support plate includes a slot defined therein.

5. A motorcycle stand, comprising:
a base;
a pair of wheels connected to the base;
first and second support members connected to and extending outward from the base;
a leverage arm connected to and extending outward from the first support member, the leverage arm being connected approximately perpendicular to the first support member intermediate an upper and lower end of the first support member; and
first and second brackets connected to the first and second support members, wherein the first bracket is adjustably connected to the first support member; and the first bracket can be adjusted in a direction that is approximately perpendicular to the first support member, wherein:
the first support member includes a guide extending outward from an upper end of the first support member, the guide having a length;
the first bracket includes a u-shaped portion having a channel sized to fit over the guide, the channel having a length that is longer than the length of the guide; and
the first bracket is adjustably connected to the first support member using the u-shaped portion and the guide.

6. A motorcycle stand, comprising:
a base;
a pair of wheels connected to the base;

first and second support members connected to and extending outward from the base;

a leverage arm connected to and extending outward from the first support member, the leverage arm being connected approximately perpendicular to the first support member intermediate an upper and lower end of the first support member; and first and second brackets connected to the first and second support members, wherein the first bracket includes a support plate adjustably connected to the first bracket; and the support plate can be adjusted in a direction that is approximately parallel with the first support member, and wherein the support plate includes a slot and the support plate is adjustably connected to the first bracket using the slot.

7. A method of lifting a motorcycle resting on a floor, comprising the steps of:

positioning a stand having a base with a pair of wheels, a pair of support members connected to and extending outward from the base, and a leverage arm connected to one of the support members, adjacent to a rear portion of the motorcycle with the leverage arm extending toward a front upper portion of the motorcycle; and engaging the rear portion of the motorcycle with the stand; and pressing the leverage arm down and into contact with the floor, thereby causing the stand to lift the rear portion of the motorcycle off of the floor and causing the base of the stand to roll underneath the rear portion of motorcycle, wherein the rear portion of the motorcycle includes a spool and the step of engaging the stand with the rear portion of the motorcycle includes the step of engaging the stand with the spool.

8. A method of lifting a motorcycle resting on a floor, comprising the steps of:

positioning a stand having a base with a pair of wheels, a pair of support members connected to and extending outward from the base, and a leverage arm connected to one of the support members, adjacent to a rear portion of the motorcycle with the leverage arm extending toward a front upper portion of the motorcycle; and engaging the rear portion of the motorcycle with the stand; and pressing the leverage arm down and into contact with the floor, thereby causing the stand to lift the rear portion of the motorcycle off of the floor and causing the base of the stand to roll underneath the rear portion of motorcycle, wherein the rear portion of the motorcycle includes a swingarm and the step of engaging the stand with the rear portion of the motorcycle includes the step of engaging the stand with the swingarm.

9. A method of lifting a motorcycle resting on a floor, comprising the steps of:

positioning a stand having a base with a pair of wheels, a pair of support members connected to and extending outward from the base, and a leverage arm connected to one of the support members, adjacent to a rear portion of the motorcycle with the leverage arm extending toward a front upper portion of the motorcycle; and engaging the rear portion of the motorcycle with the stand; and pressing the leverage arm down and into contact with the floor, thereby causing the stand to lift the rear portion of the motorcycle off of the floor and causing the base of the stand to roll underneath the rear portion of motorcycle, wherein the step of pressing the leverage arm down into contact with the floor causes the base of the stand to roll past a motorcycle axle included in the rear portion of the motorcycle.

* * * * *